UNITED STATES PATENT OFFICE.

PER GÖSTA EKSTRÖM, OF SKUTSKÄR, SWEDEN.

CONVERTING OF CELLOSE INTO FERMENTABLE SUGAR.

1,087,744.     Specification of Letters Patent.     Patented Feb. 17, 1914.

No Drawing.     Application filed August 5, 1911. Serial No. 642,465.

*To all whom it may concern:*

Be it known that I, PER GÖSTA EKSTRÖM, a subject of the King of Sweden, and resident of Skutskär, in the Kingdom of Sweden, have invented certain new and useful Improvements in the Converting of Cellose into Fermentable Sugar, of which the following is a specification.

It is a known fact that cellulosic material can be transformed into fermentable sugar by being treated with an acid. The investigations of the inventor have proved that the cellulose, when treated with an acid, is not directly transformed into sugar but that intermediate products are formed. These intermediate products are acid cellulose and cellulose. As to the nature of these substances and the method of producing them further information can be obtained from the German patent specification No. 193112 (corresponding to the U. S. patent application Serial No. 352105) and the U. S. patent specification No. 970029. From these publications it will be clear that if cellulose or material containing cellulose is, for a suitable, relatively short time, treated with a concentrated acid, the acid cellulose is obtained. If, on the contrary, the cellulose or the material containing cellulose is for a longer time, for instance five hours, treated with a concentrated acid (for instance sulfuric acid of 70–80 per cent.) the cellose is formed. The cellose is soluble in water and can be converted into fermentable sugar by being boiled under atmospheric pressure with a diluted acid. It can, however, not be transformed into fermentable sugar by means of a concentrated acid. Thus, in the strong solution which is obtained when treating cellulose with for instance sulfuric acid of 70–80 per cent., the cellose cannot be directly converted into fermentable sugar, but only after having been diluted.

The novel feature of the present invention now consists in diluting the strong cellose solution by means of the waste lye from sulfite cellulose factories. This lye, resulting from the boiling of wood according to the well known sulfite cellulose method, principally contains organic constituents, calcium bisulfite free sulfurous acid and a certain amount of sugar. By using for the said purpose this waste lye which has a rather high temperature when coming from the boilers, the advantage is gained, that, at the same time as the strong cellose solution is diluted, the same is heated and its content of acid is to begin with partially and finally completely neutralized. Furthermore, the solution is enriched with the sugar contained in the waste sulfite cellulose lye. From the sugar solution obtained in this manner sugar may be obtained by evaporating the solution and crystallizing out the sugar. Ethyl alcohol can also be obtained by fermenting the said solution and distilling off the alcohol formed thereby.

In the following description I cite an example of the manner in which the method can be executed in practice: To 50 liters of a cellose solution obtained in the above manner, I added 1000 liters of waste sulfite cellulose lye. The temperature of the said lye before adding the same was 100 degrees Cent. and after the addition the mixture had a temperature of 85 degrees Cent. Before the addition of the waste lye, the concentration of the acid in the cellose solution was 80 per cent. and after the addition of the waste lye the acid was diluted to 2.5 per cent. Then the mixture was boiled under ordinary pressure for a time of 1 hour. After this time the cellose had been completely transformed into sugar, and the sugar solution obtained contained about 7 per cent. of sugar.

Having now described my invention, what I claim as new and desire to secure by Letters Patent is:

In the method of converting concentrated cellose solutions into fermentable sugar, diluting the said solutions by means of waste sulfite cellulose lyes and boiling the solution thus diluted under atmospheric pressure, substantially as described.

In witness whereof, I have hereunto signed my name in the presence of two subscribing witnesses.

PER GÖSTA EKSTRÖM.

Witnesses:
    AXEL EHRNER,
    IVERTA GHISN.